United States Patent
Aly et al.

(10) Patent No.: US 11,977,883 B2
(45) Date of Patent: *May 7, 2024

(54) RECONFIGURABLE CRYPTO-PROCESSOR

(71) Applicants: The Board of Trustees of the University of Illinois, Urbana, IL (US); University of Virginia Patent Foundation, Charlottesville, VA (US)

(72) Inventors: Mohamed E. Aly, Champaign, IL (US); Wen-Mei W. Hwu, Champaign, IL (US); Kevin Skadron, Charlottesville, IL (US)

(73) Assignees: The Board of Trustees of the University of Illinois, Urbana, IL (US); University of Virginia Patent Foundation, Charlottesville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/448,860

(22) Filed: Sep. 24, 2021

(65) Prior Publication Data

US 2022/0012052 A1    Jan. 13, 2022

Related U.S. Application Data

(63) Continuation of application No. 16/026,221, filed on Jul. 3, 2018, now Pat. No. 11,157,275.

(51) Int. Cl.
*G06F 9/30* (2018.01)
*G06F 21/60* (2013.01)

(52) U.S. Cl.
CPC ........ *G06F 9/3001* (2013.01); *G06F 9/30029* (2013.01); *G06F 9/30032* (2013.01); *G06F 9/30149* (2013.01); *G06F 21/602* (2013.01)

(58) Field of Classification Search
CPC ............ G06F 9/30032; G06F 9/30149; G06F 9/3001; G06F 21/72; G06F 21/602; G06F 9/30029
(Continued)

(56) References Cited

U.S. PATENT DOCUMENTS 4,541,048 A    9/1985  Propster et al.
8,335,810 B2  12/2012  Klein et al.
(Continued)

OTHER PUBLICATIONS

Topic DL01: Activation functions and its Types in Artifical Neural network https://abhigoku10.medium.com/activation-functions-and-its-types-in-artifical-neural-network-14511f3080a8abhigoku10 Mar. 27, 2018 (Year: 2018).*

(Continued)

*Primary Examiner* — Benjamin A Kaplan
(74) *Attorney, Agent, or Firm* — McDonnell Boehnen Hulbert & Berghoff LLP

(57) ABSTRACT

The present disclosure relates to systems and methods that provide a reconfigurable cryptographic coprocessor. An example system includes an instruction memory configured to provide ARX instructions and mode control instructions. The system also includes an adjustable-width arithmetic logic unit, an adjustable-width rotator, and a coefficient memory. A bit width of the adjustable-width arithmetic logic unit and a bit width of the adjustable-width rotator are adjusted according to the mode control instructions. The coefficient memory is configured to provide variable-width words to the arithmetic logic unit and the rotator. The arithmetic logic unit and the rotator are configured to carry out the ARX instructions on the provided variable-width words. The systems and methods described herein could accelerate various applications, such as deep learning, by assigning one or more of the disclosed reconfigurable copro-
(Continued)

cessors to work as a central computation unit in a neural network.

20 Claims, 10 Drawing Sheets

(58) Field of Classification Search
USPC .......................................................... 713/190
See application file for complete search history.

(56) References Cited

U.S. PATENT DOCUMENTS

| 8,762,926 B2* | 6/2014 | Nakatani | G11C 29/10 716/112 |
|---|---|---|---|
| 2012/0265967 A1* | 10/2012 | Gschwind | G06F 9/30181 712/210 |
| 2013/0262421 A1 | 10/2013 | Ferguson et al. | |
| 2014/0013082 A1 | 1/2014 | Agarwal et al. | |

OTHER PUBLICATIONS

"Arithmetic Logic Unit (ALU): Definition, Design & Function," Study.com, May 21, 2015, https://study.com/academy/lesson/arithmetic-logic-unit-alu-definition-design-function.html, 2015.

Broesch, James D., "Digital Signal Processing, Chapter 8," Digital Signal Processing Instant Access, www.newnespress.com, 2009, pp. 135-146.

El-Hadedy, Mohamed et al., "R-NNPE: Reconfigurable Neural Network Processing Elements," TECHCON-2017, Austin, TX, Sep. 27, 2017, 4 pages.

El-Hadedy, Mohamed et al., "Reco-CPIOT: Reconfigurable Crypto-Processorfor Secure IoT Applications," TECHCON-2017, Austin, TX, Sep. 27, 2017, 24 pages.

El-Hadedy, Mohamed et al., PPE-ARX: Area- and Power-Efficient VLIW Programmable Processing Element for IoT Crypto-Systems, AHS-2017 (Adaptive Hardware Systems, NASA/ESA), California, USA, Jul. 24-27, 2017, 8 pages.

* cited by examiner

Arithmetic and Logic Unit Truth Table — 220

| Acc | | Modes | | | Operations | | Operation |
|---|---|---|---|---|---|---|---|
| Inst (6) | Inst (5) | Inst (4) | Inst (3) | Inst (2) | Inst (1) | Inst (0) | |
| | | 1 | 1 | 1 | 0 | 0 | XOR (ALU 64 bits) |
| | | 1 | 1 | 1 | 0 | 1 | ADD (ALU 64 bits) |
| | | 1 | 1 | 1 | 1 | 0 | INC (ALU 64 bits) |
| | | 1 | 1 | 1 | 1 | 1 | SUB (ALU 64 bits) |
| | | 0 | 0 | 0 | 0 | 0 | XOR (ALU 32 bits) |
| | | 0 | 0 | 0 | 0 | 1 | ADD (ALU 32 bits) |
| | | 0 | 0 | 0 | 1 | 0 | INC (ALU 32 bits) |
| | | 0 | 0 | 0 | 1 | 1 | SUB (ALU 32 bits) |
| | | 1 | 0 | 1 | 0 | 0 | XOR (ALU 16 bits) |
| | | 1 | 0 | 1 | 0 | 1 | ADD (ALU 16 bits) |
| | | 1 | 0 | 1 | 1 | 0 | INC (ALU 16 bits) |
| | | 1 | 0 | 1 | 1 | 1 | SUB (ALU 16 bits) |
| | | 0 | 1 | 1 | 0 | 0 | XOR (ALU 48 bits) |
| | | 0 | 1 | 1 | 0 | 1 | ADD (ALU 48 bits) |
| | | 0 | 1 | 1 | 1 | 0 | INC (ALU 48 bits) |
| | | 0 | 1 | 1 | 1 | 1 | SUB (ALU 48 bits) |

Inst (6): 0 = Reset the accumulator; 1 = Accumulate

Figure 2B

| Operation | Mode | RC3 | RC2 | RC1 | RC0 | Data width |
|---|---|---|---|---|---|---|
| ROR (1 → 15) | 00001010101 | 1→F | 1→F | 1→F | 1→F | 64 Bits Mode |
| ROR (16 → 31) | 01101010101 | 1→F | 1→F | 1→F | 1→F | |
| ROR (16 → 31) | 01101010101 | 1→F | 1→F | 1→F | 1→F | |
| ROR (32 → 47) | 10001010101 | 1→F | 1→F | 1→F | 1→F | |
| ROR (48 → 63) | 11101010101 | 1→F | 1→F | 1→F | 1→F | |
| ROR (1 → 15) | 00011011101 | 1→F | 1→F | 1→F | 1→F | 32 Bits Mode |
| ROR (1 → 15) | | | | | | |
| ROR (16 → 31) | 01111011101 | 1→F | 1→F | 1→F | 1→F | |
| ROR (16 → 31) | | | | | | |

Figure 3B

RECONFIGURABLE CRYPTO-PROCESSOR

CROSS-REFERENCE TO RELATED APPLICATION

The present application claims the benefit of U.S. patent application Ser. No. 16/026,221, filed Jul. 3, 2018, the content of which is herewith incorporated by reference.

BACKGROUND

As internet-connected devices and systems (e.g., the Internet of Things) become more commonplace, maintaining device security will be an increasingly important and challenging effort. For example, communications with medical devices, such as implantable cardiac pacemakers, must be secured (e.g., encrypted and/or otherwise access-controlled) to prevent inadvertent operation or malicious attacks. Furthermore, wearable devices that collect biometric data, location data, and/or other personal user data should not be accessible to third parties. Current communication standards, such as BLUETOOTH and ZigBee, have been shown to be vulnerable to "man-in-the-middle" attacks that can reveal cryptographic keys. Accordingly, there exists a need for communication systems with improved security protections.

SUMMARY

The present disclosure relates to systems and methods that may be utilized to implement a reconfigurable cryptographic coprocessor, among other possibilities.

In a first aspect, a system is provided. The system includes an instruction memory configured to provide add, rotate, XOR (ARX) instructions and mode control instructions. The system also includes an arithmetic logic unit. A programmable width of the arithmetic logic unit is adjusted according to the mode control instructions. The system additionally includes a rotator. A programmable width of the rotator is adjusted according to the mode control instructions. The system further includes a coefficient memory. The coefficient memory is configured to provide variable-width words to the arithmetic logic unit and the rotator. The arithmetic logic unit and the rotator are configured to carry out the ARX instructions on the provided variable-width words.

In a second aspect, a method is provided. The method includes providing, from an instruction memory, add, rotate, XOR (ARX) instructions and mode control instructions. The method also includes adjusting a programmable width of an arithmetic logic unit according to the mode control instructions. The method additionally includes adjusting a programmable width of a rotator according to the mode control instructions. Furthermore, the method includes providing variable-width words to the arithmetic logic unit and the rotator. Yet further, the method includes causing the arithmetic logic unit and the rotator to carry out the ARX instructions on the provided variable-width words.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 2B illustrates a truth table for the reconfigurable arithmetic logic unit, according to example embodiments.

FIG. 3B illustrates a truth table for the reconfigurable rotator, according to example embodiments.

DETAILED DESCRIPTION

Figure 1:
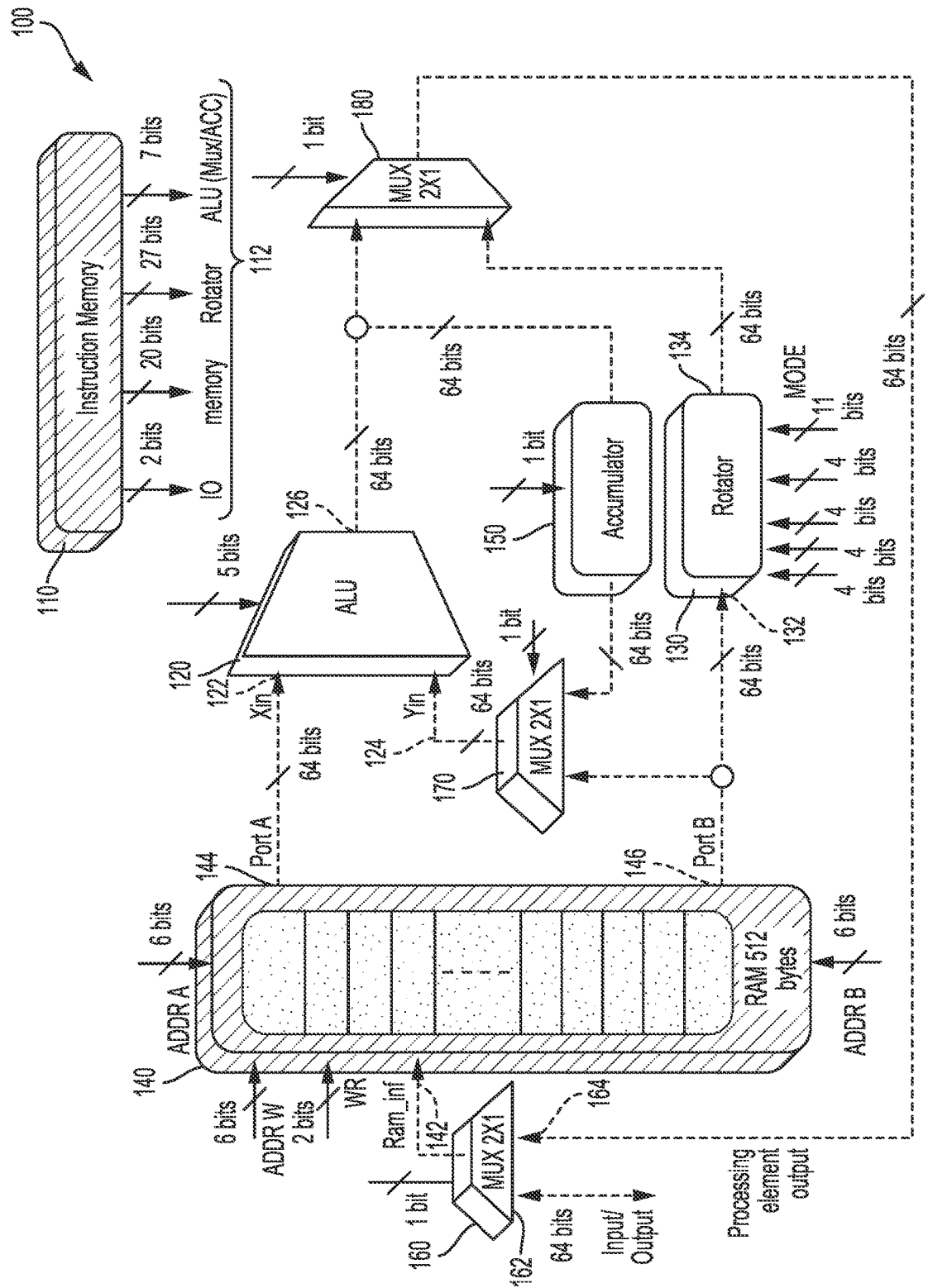
FIG. 1 illustrates a system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

In an example embodiment, a reconfigurable cryptographic coprocessor could provide secure communications on resource-constrained devices (e.g., smartphones, smartwatches, or other types of wearable devices). The reconfigurable cryptographic coprocessor could include a plurality of reconfigurable processing elements. The reconfigurable cryptographic coprocessor could be fabricated with current semiconductor microfabrication technologies and various material systems (e.g., silicon, III-V materials, etc.). Yet further, the reconfigurable cryptographic coprocessor could be adapted to operate with machine-learning and deep-learning applications. Because of its small area and high performance, the coprocessor could be utilized in a multi-core configuration in which a plurality of coprocessor units could be interconnected or otherwise densely coupled so as to process larger amounts of data or accomplish more complex computations and functions. Without limitation, the coprocessor could be utilized for functions such as:

password verification, verifying file or message integrity, creating file identifiers, verifying proof of work, and generation of pseudorandom keys and/or passwords.

In some embodiments, the reconfigurable cryptographic coprocessor described herein could carry out a cryptographic hash function. As an example, the cryptographic hash function could include a Blue Midnight Wish (BMW) hash function, a Secure Hash Algorithm 1 (SHA-1), a Secure Hash Algorithm 2 (SHA-2), or a Secure Hash Algorithm 3 (SHA-3).

Specifically, the BMW-n hash function family includes four instances where n=224, 256, 384, and 512, where n is the size of the hash value. BMW performs four different operations in the hash computation stage: bit-wise logical word XOR, word addition and subtraction, shift operations (left or right), and rotate operations. The size of a word is 32 bits for BMW-224/256 and 64 bits for BMW-384/512.

Systems and methods described herein could be implemented in FPGA and ASIC formats to realize novel area-efficient and power-efficient programmable VLIW processing elements that utilize ARX operations for use in Internet of Things cryptographic systems. Such systems and methods offer improvements over conventional implementations in terms of throughput, area, frequency, and throughput/area.

In some embodiments, the reconfigurable cryptographic coprocessor could be utilized as a verifying compiler (e.g., a "high-assurance" compiler). That is, the coprocessor disclosed herein could be configured to output object code as well as proof of correspondence between object and source code.

II. Example Systems

FIG. 1 illustrates a system 100, according to an example embodiment. System 100 could include a reconfigurable processing element, which could be utilized in applications such as cryptography and other information processing technologies. System 100 includes an instruction memory 110. The instruction memory 110 is configured to provide instructions 112 (e.g., add, rotate, XOR (ARX) instructions and mode control instructions) to other elements of system 100.

The system 100 also includes an arithmetic logic unit 120. The arithmetic logic unit 120 could process input words having variable widths. Accordingly, a programmable width of the arithmetic logic unit 120 is adjusted according to the mode control instructions from the instruction memory 110. In some embodiments, the arithmetic logic unit 120 could be configured as a carry lookahead adder (CLA), which calculates the carry signals in advance during adding based on the input bits to increase computing performance.

In some embodiments, the arithmetic logic unit 120 is configured to carry out three different operations: word XOR, word addition, and subtraction (modulo $2^n$). The arithmetic logic unit 120 can process data either from both coefficient memory ports (Port A and Port B) or the coefficient memory (Port A) and the accumulator register. In each cycle, the arithmetic logic unit 120 can process 4 data words of 16 bits, 2 data words of 32 bit, or 1 data word of 64 bit based on the mode control bits. In each cycle, the arithmetic logic unit 120 can process 4 data words of 16 bits, 2 data words of 32 bit, or 1 data word of 64 bit, based on the value of the control mode bits.

The system 100 also includes a rotator 130. The rotator 130 could also be configured to process input words according to variable widths. In such scenarios, a programmable width of the rotator 130 can be adjusted according to the mode control instructions from the instruction memory 110. The rotator 130 could be configured to accept variable-width words from the second output port 146 of the coefficient memory 140 via rotator input port 132. The rotator 130 could perform operations on the variable-width words and output them via rotator output port 134.

The system 100 also includes a coefficient memory 140. The coefficient memory 140 is configured to provide variable-width words to the arithmetic logic unit 120 and the rotator 130. The arithmetic logic unit 120 and the rotator 130 are configured to carry out the ARX instructions on the provided variable-width words. In some embodiments, the coefficient memory 140 includes a 512-byte block. The coefficient memory 140 includes a first address port 148 (ADDRA) and a second address port 149 (ADDRB), which are each configured to accept 6-bit instructions from the instruction memory 110. Additionally or alternatively, the coefficient memory 140 could include a first output port 144 and a second output port 146. ADDRA and ADDRB are utilized to control the values output on the first output port 144 and the second output port 146. In example embodiments, the first output port 144 and the second output port 146 have a width of 64-bits; however, other bit widths are possible and contemplated. ADDRW is responsible for writing data into the memory through ram_inf.

In some embodiments, system 100 includes an accumulator 150. Furthermore, the arithmetic logic unit 120 could include a first ALU input 122 and a second ALU input 124. In such scenarios, the first ALU input 122 could be configured to accept the variable-width words from the first output port 144. Additionally, the second ALU input 124 is configured to accept an output of multiplexer 170, which could include variable-width words from the second output port 146 or an output 152 of the accumulator 150. The arithmetic logic unit 120 could be configured to operate on the variable-width words and provide output via an arithmetic logic unit output port 126.

In some embodiments, the mode control instructions provided by the instruction memory 110 could include an instruction fetch address and a write address. In such scenarios, the first address port 148 is configured to accept the instruction fetch address and the second address port 149 is configured to accept the write address.

Additionally or alternatively, the coefficient memory 140 could be configured to accept the instruction fetch address and the write address of a new variable-width word while other elements of the system (e.g., arithmetic logic unit 120 and/or rotator 130) operate on a present variable-width word.

In some embodiments, the ARX instructions and the mode control instructions provided by the instruction memory 110 include very long instruction words (VLIWs). For example, the VLIWs could be 56-bits in size. It will be understood that other bit-lengths are possible and contemplated herein. In some embodiments, the instruction memory 110 could be configured to provide VLIWs so as to implement an encryption algorithm.

The instruction memory 110 could be configured to store up to 448-bytes of VLIWs.

In some embodiments, the arithmetic logic unit 120 could be configured as at least one of a carry lookahead adder (CLA) or a ripple carry adder (RCA). Other types of adders are contemplated and possible.

In some embodiments, system 100 could include a finite state machine 210 configured as illustrated and described in reference to FIGS. 2A, 2B, 3A, and 3B to control respective operating configurations of the arithmetic logic unit 120 and the rotator 130 based on the mode control instructions. That is, at least a portion of the instructions provided by the instruction memory 110 could be utilized to control the finite state machine 210 and consequently, as described herein, the arithmetic logic unit 120 and/or the rotator 130.

Figure 2A:
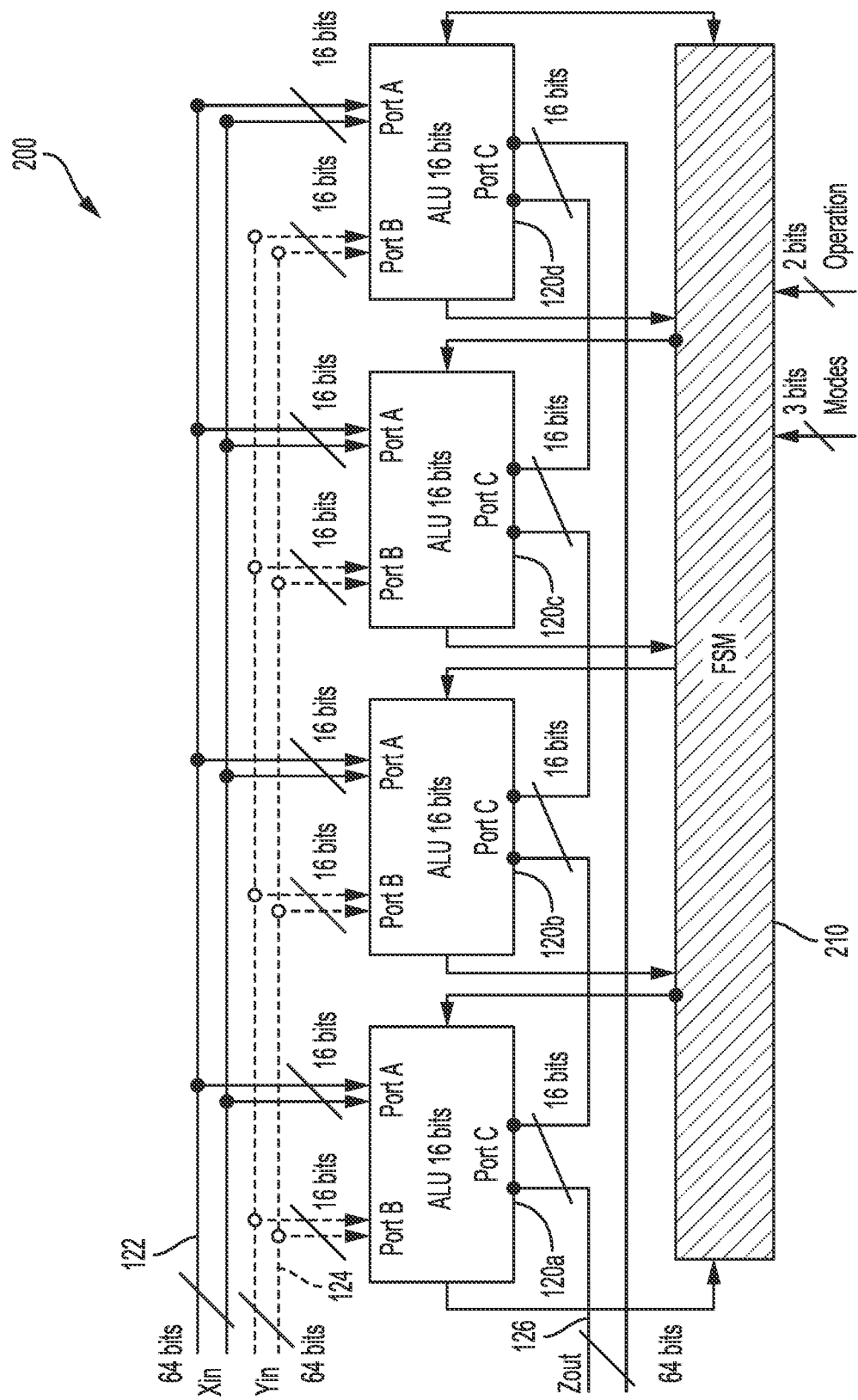
FIG. 2A illustrates a scenario involving a reconfigurable arithmetic logic unit and a finite state machine, according to example embodiments.

FIG. 2A illustrates a scenario 200 involving reconfigurable arithmetic logic unit 120 and finite state machine 210, according to example embodiments. In such a scenario, the arithmetic logic unit 120 comprises a plurality of sub-ALUs 120a-120d. The plurality of sub-ALUs 120a-120d can be controlled according to 7-bit ALU control instructions from the finite state machine 210. In such a scenario, the sub-ALUs 120a-120d could be configurable to operate as at least one of: four 16-bit sub-ALUs, two 32-bit sub-ALUs, or one 64-bit arithmetic logic unit.

FIG. 2B illustrates a logical truth table 220 for the reconfigurable arithmetic logic unit 120, according to example embodiments. As illustrated, the two operation bits could control a logical operation of the arithmetic logic unit 120. The logical operations could include, for example, exclusive OR (XOR, 00), word addition (ADD, 01), word increment (INC, 10), or word subtraction (SUB, 11). Furthermore, the three mode bits could control whether the logical operation is performed with a 64-bit (111), 48-bit (011), 32-bit (000), or 16-bit words (101). The embodiments described herein could include more or fewer mode bits, for example to accommodate more or fewer logical operations. The logical truth table 220 also includes two control bits for the accumulate function and reset accumulator function. It will be understood that many different truth table configurations exist for a given set of states. All such other configurations are possible and contemplated herein.

Figure 3A:
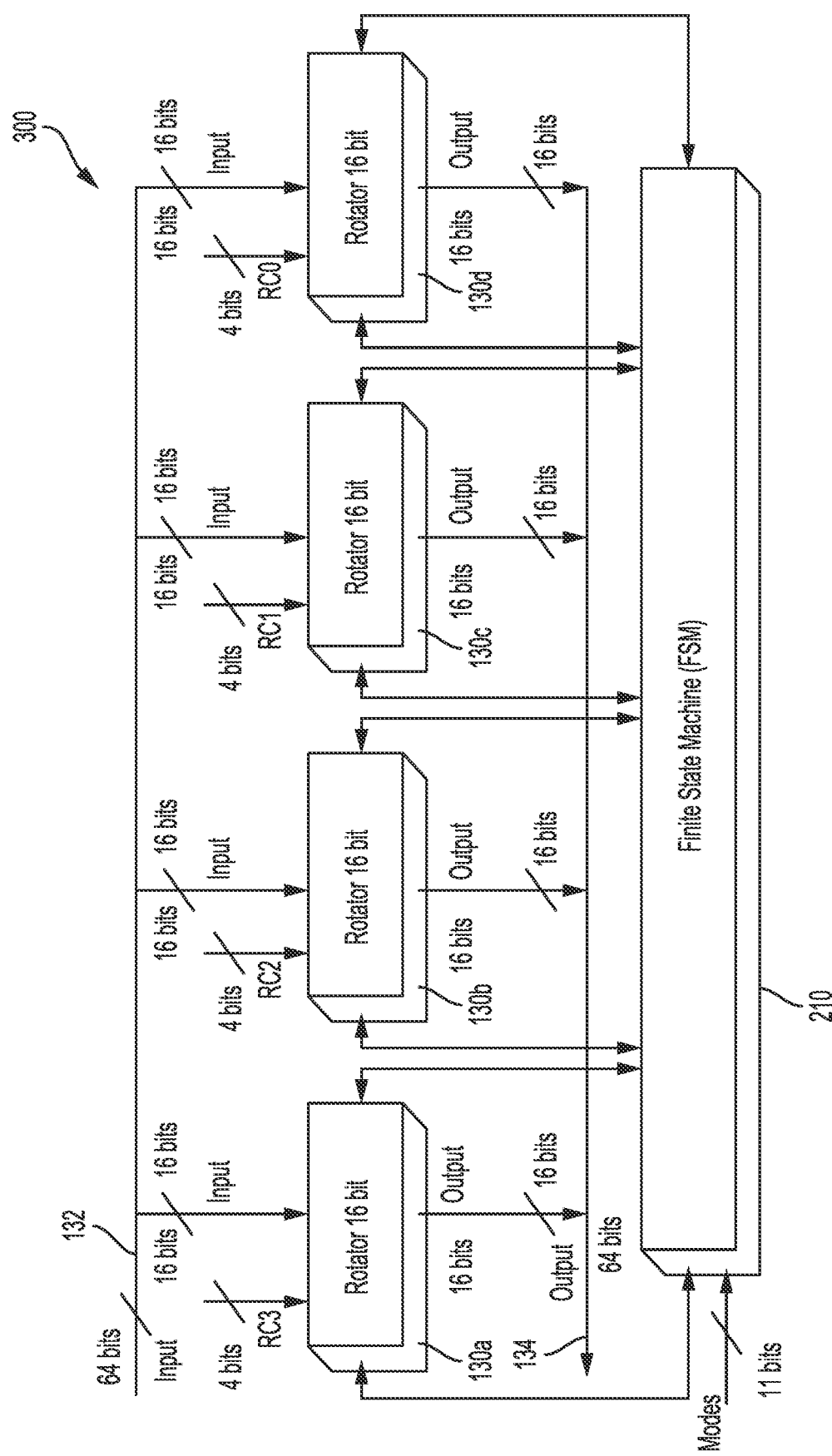
FIG. 3A illustrates a scenario involving a reconfigurable rotator and a finite state machine, according to example embodiments.

FIG. 3A illustrates a reconfigurable rotator 130 and finite state machine 210, according to example embodiments. For example, the rotator 130 could include a plurality of sub-rotators 130a-130d, which could be controlled according to four 4-bit rotator control instructions from the finite state machine 210. In some embodiments, the plurality of sub-rotators 130a-130d could include a 64×4 array of 2×1 multiplexers. Additionally or alternatively, the plurality of sub-rotators 130a-130d could be configurable to operate as at least one of: four 16-bit sub-rotators, two 32-bit sub-rotators, or one 64-bit rotator.

FIG. 3B illustrates a truth table 320 for the reconfigurable rotator 130, according to example embodiments. The truth table 320 illustrates several operations that could be performed by the rotator 130, for example the rotator 130 could execute a circular shift operation so as to shift a word to the left or right. Furthermore, the rotator 130 could be operable to execute a circular shift to the right for the various sets of sixteen bits of a 64-bit or 32-bit word (e.g., ROR (1-15), ROR (16-31), ROR (32-47), and ROR (48-63)). The rotator 130 is controlled by four 4-bit RC control bits. Based on the value of the mode control bits, the rotator 130 can rotate to the right four 16-bit words, two 32-bit words, or one 64-bit words.

For instance, to rotate the 64 bit input data 12 times to the right, the mode signal should be 00001010101, and RC0, RC1, RC2, and RC3 have the same value of 1100 (0xC). Alternatively, in a scenario with four data words of 16 bits, to rotate the first word 12 times to the right, the second word 5 times to the left, the third word 7 times to the right, and the fourth word 10 times to the left, the mode signal is 00000000000, and RC0=1100, RC1=1011, RC2=0111, and RC3=0110.

In some embodiments, the system 100 could be realized using a field-programmable gate array (FPGA). For example, the FPGA could include a Xilinx Virtex-5. In such a scenario, a total area of the system is 0.15 mm$^2$ or less.

Additionally or alternatively, the system 100 could be realized using an application-specific integrated circuit (ASIC). Other types of processors, circuits, computers, or electronic devices configured to carry out software instructions are contemplated herein. It will be understood that other ways to implement system 100 are possible and contemplated herein.

In example embodiments, the system 100 could be configured to carry out a 16-bit permutation ($\pi$16-Cipher) encryption algorithm. Furthermore, the system 100 could be configured to carry out a cryptographic hash function. As an example, the cryptographic hash function could include at least one of: a Blue Midnight Wish (BMW) hash function, Secure Hash Algorithm 1 (SHA-1), Secure Hash Algorithm 2 (SHA-2), or Secure Hash Algorithm 3 (SHA-3). Other types of encryption algorithms or functions are possible and contemplated herein.

System 100 could be implemented in a computing device, such as an external computer, or a mobile computing platform, such as a smartphone, tablet device, personal computer, wearable device, etc. Additionally or alternatively, the system 100 can include, or could be connected to, a remotely-located computer system, such as a cloud server network. Furthermore, system 100 could include, or be incorporated into, a robotic system, an aerial vehicle, a smart home device, a smart infrastructure system, among other possibilities. Without limitation, the system 100 could additionally or alternatively include at least one deep neural network, another type of machine learning system, and/or an artificial intelligence system.

System 100 could include a read/write interface 160 configured to accept 64-bit input words from a further system and provide 64-bit output words to the further system via an input/output port 162. In some embodiments, the read/write interface 160 could include a multiplexer configured to output words to the coefficient memory 140 via input port 142. The read/write interface 160 may receive the output of processing element 180.

Figure 4:
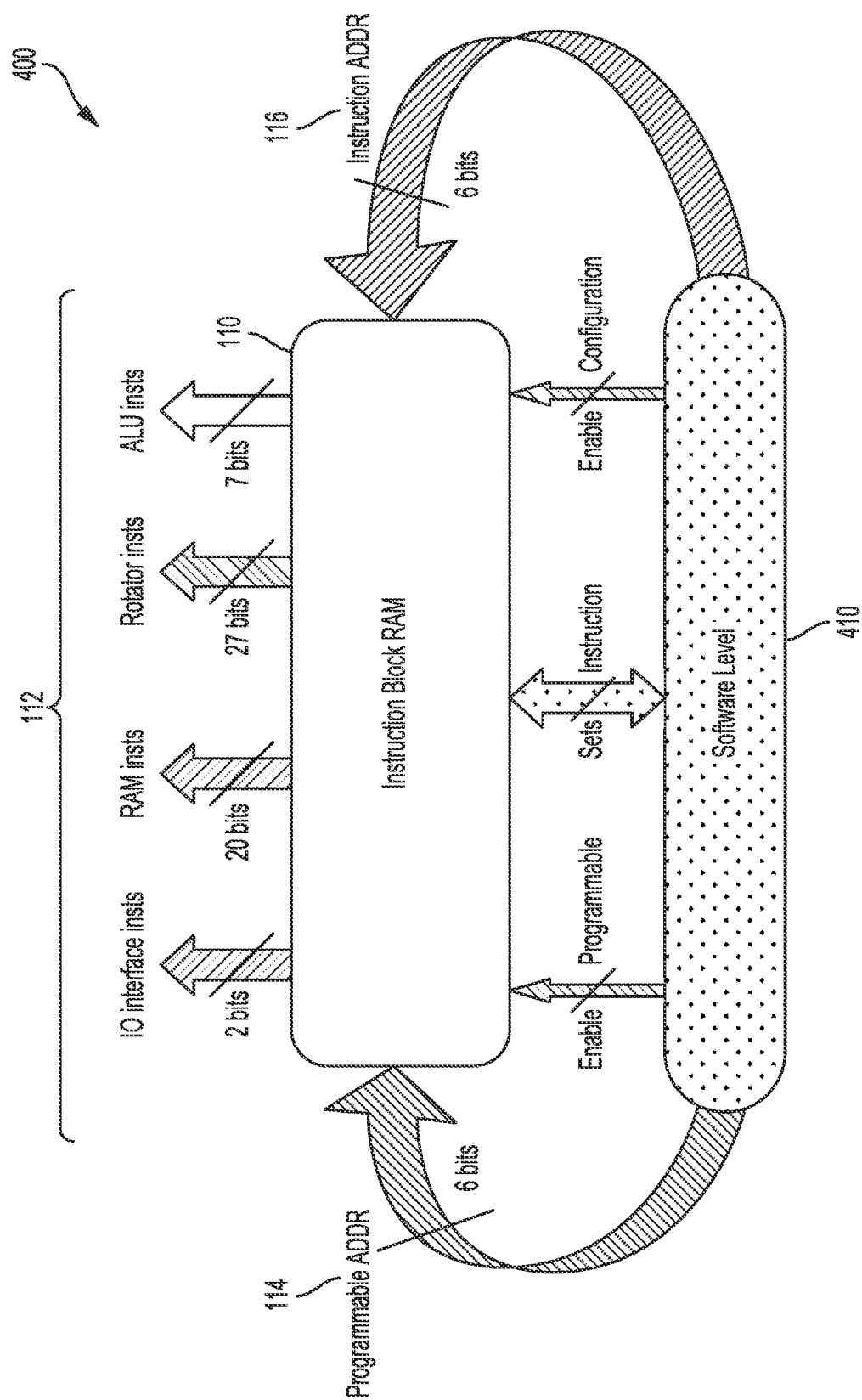
FIG. 4 illustrates a schematic diagram that includes an instruction block and a software level interface, according to an example embodiment.

FIG. 4 illustrates a schematic diagram 400 that includes instruction memory 110 and software level interface 410, according to an example embodiment. In some scenarios, the software level interface 410 may provide to the instruction memory 110 an instruction address 116 and a write address 114. In some embodiments, the instruction address 116 and the write address 114 could be passed to the coefficient memory 140, as described herein.

In some embodiments, the instruction memory 110 could be 448 bytes. However, other memory sizes are possible. The instruction memory 110 stores the program that implements the chosen cipher algorithm, expressed as a sequence of VLIW instructions. The instruction memory 110 has two address ports; the first 6-bit port acts as an instruction fetch address 116. The other 6-bit port specifies a write address 114, to change the values of the instruction memory 110. There are two enable bits: one allows read for instruction fetch and the other port is used to change the values of the instruction memory. This dual-ported design allows a new cipher program to be streamed in while the current program progresses. Additionally, it enables an early start on a new program while the rest of the new program is still loading. In the case that a program cannot fit entirely into the on-chip memory, the dual-port can still provide seamless processing. The instruction-fetch signal (Instruction ADDR) works as a pointer moving sequentially and wrapping around the instruction set.

While this processing is happening, the write ADDR (Programmable ADDR) is loading the new code. Because only one read and write operation are allowed per cycle, conflicts are avoided unless the read and write addresses are initialized to the same values, which can be verified.

Figure 5:
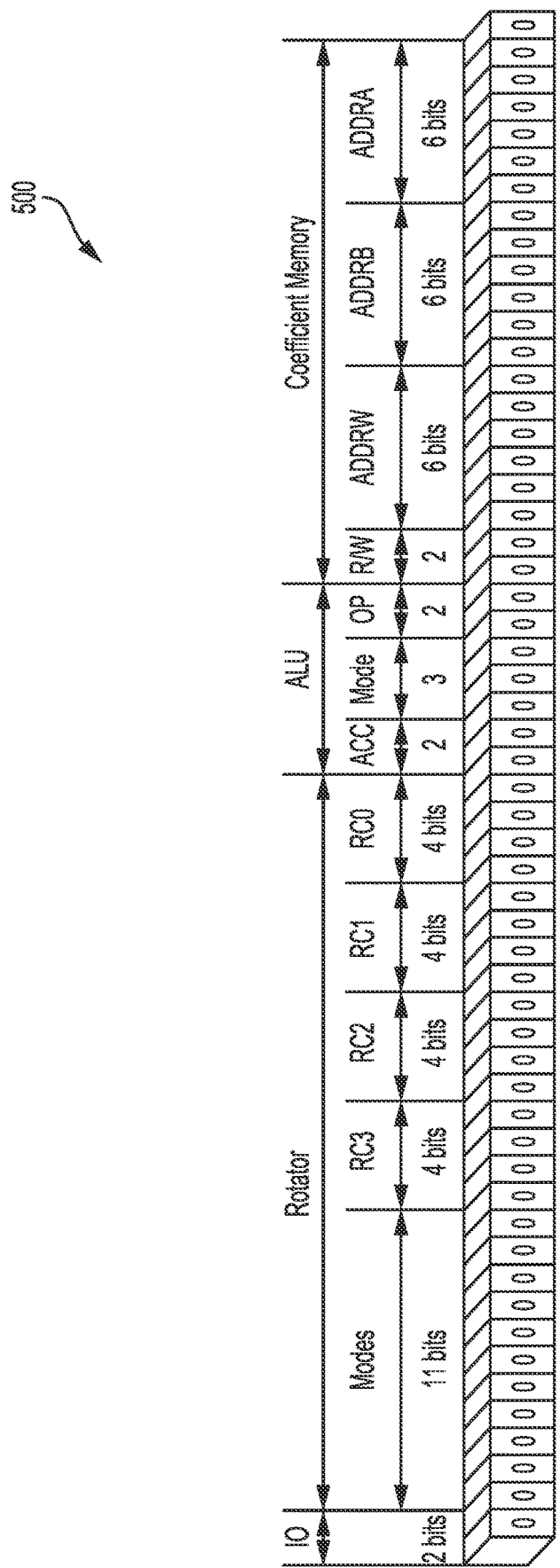
FIG. 5 illustrates a schematic diagram of an instruction, according to an example embodiment.

FIG. 5 illustrates a schematic diagram of an instruction 500, according to an example embodiment. Instruction 500 could represent a single row, which could be stored in, and provided by, the instruction memory 110. The instruction 500 could be provided by the instruction memory 110 and could include could a plurality of sub-instructions for several different elements of system 100. Specifically, each instruction 500 consists of 2 bits to control the input/output interface, 20 bits for controlling the coefficient memory 140, 27 bits for controlling the different sections of the rotator 130, and 7 bits for controlling the arithmetic logic unit 120. It will be understood that other instruction lengths and/or sub-instruction lengths are possible and contemplated.

The functionality of the systems and methods described herein was verified on a Xilinx Virtex-5 XC5VLX110 FPGA device. The system was described in VHDL and was synthesized using ISE Design Suite 14.7. The results provide that example systems comprise only 227 slices of the FPGA fabric, which includes the 512-byte coefficient memory, a 448 byte instruction memory, all the computational units (Rotator and ALU) and control logic. The design can be clocked at 250 MHz. Furthermore, the Virtex-5 FPGA has Look-Up Tables (LUTs) with six inputs and one output. Thus, a single LUT can output one bit of data from six-bit input data. This unique feature could be potentially utilized to further improve performance.

Because the systems and methods described herein are digital in nature, special SRAM blocks are not needed. As such, present systems and methods are amenable to standard ASIC flow. Specifically, the design can be implemented in an ASIC flow (from an RTL description in a language such as Verilog or VHDL to a GDS II geometry file) with a 28/32 nm design kit from Synopsys. To estimate the extreme case, the design is synthesized on the worst case corner (Slow-Slow, high temperature and nominal voltage) of the technology. The maximum clock frequency is estimated by running timing analysis and timing closure to meet the positive slack requirement for both setup and hold time. The maximum clock frequency is approximately 952 MHz. The average power is evaluated with the Prime-time PX tool. The synthesized gate level net-list is fed into the IC Compiler for place and route (P&R), after which the area information can obtained.

Figure 6:
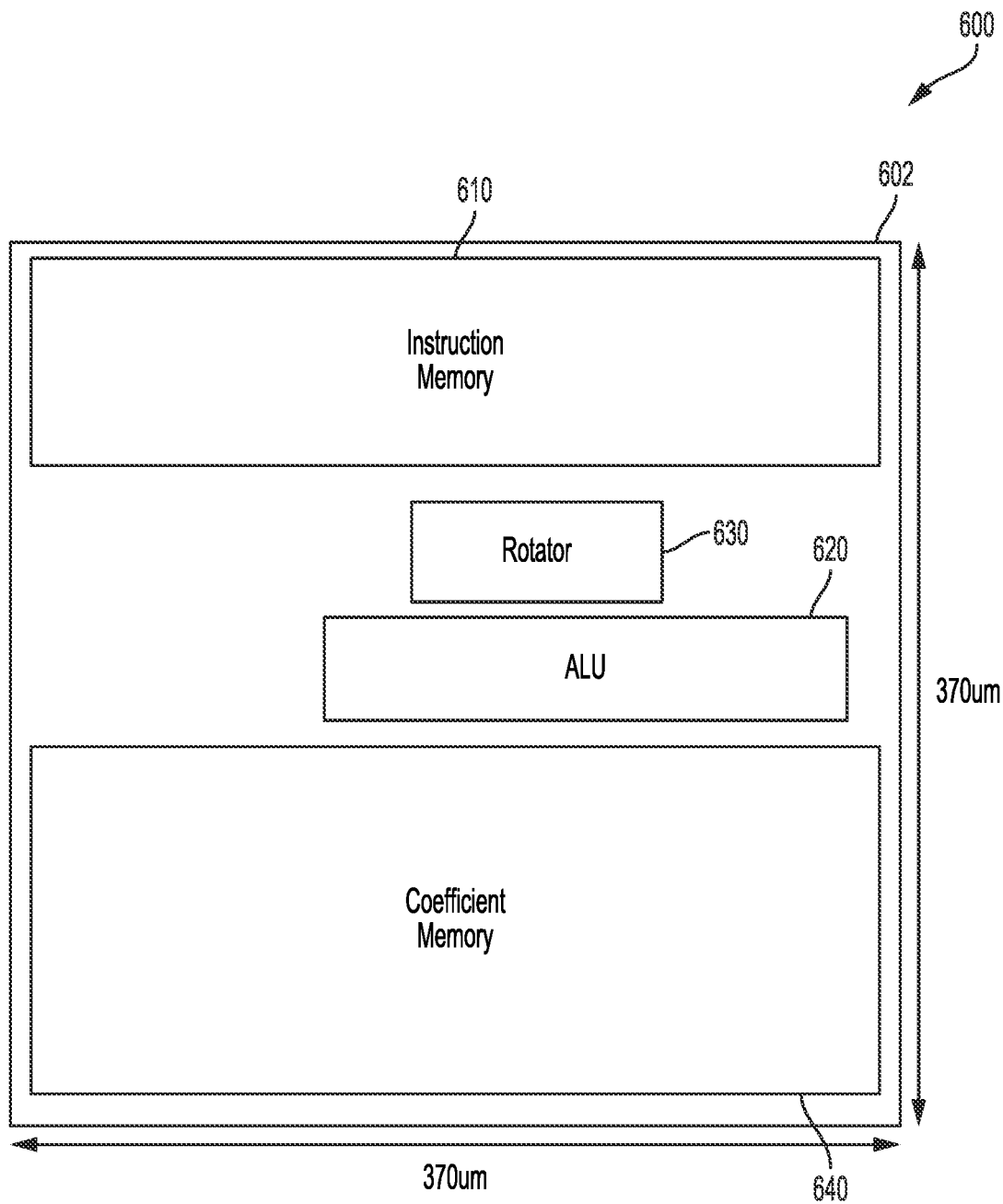
FIG. 6 illustrates a chip layout of a system, according to an example embodiment.

FIG. 6 illustrates a chip layout 600 of a 64-bit system design (e.g., system 100 as illustrated and described with reference to FIG. 1), according to an example embodiment. The chip layout 600 is obtained after place and route and illustrates outlines of the instruction memory 110, rotator 130, arithmetic logic unit 120, and coefficient memory 140. As illustrated, the core area utilization is approximately 80%. The total area is approximately 0.15 mm$^2$ and the cell area is approximately 0.1 mm$^2$. In some embodiments, the cell dimensions could be 370 microns by 370 microns; however, other sizes, form factors, dimensions, and/or layouts are possible and contemplated herein.

The modular design of the described systems and methods provide flexibility for expansion. For example, the interconnect overhead between modules could be minimal and the substantial portion of the area will be from the macro cells themselves. The compact design makes it suitable to be embedded as an IP macro in a larger IoT system which could benefit from the security and cryptography features. Additionally, the portability and programmability of the design offers the possibility of being employed in a wide range of IoT applications.

The described systems and methods also offer low power usage. Even at maximum operational frequency, the total average power of an example system is 34.5 μW with a leakage of 11.126 μW. The expected power consumption will linearly increase as the bit width increases. As the first-order estimation, the total power consumption for a 512-bit width will be only about 260 and which can be further reduced by lowering the voltage and relaxing the clock frequency.

Figure 7:
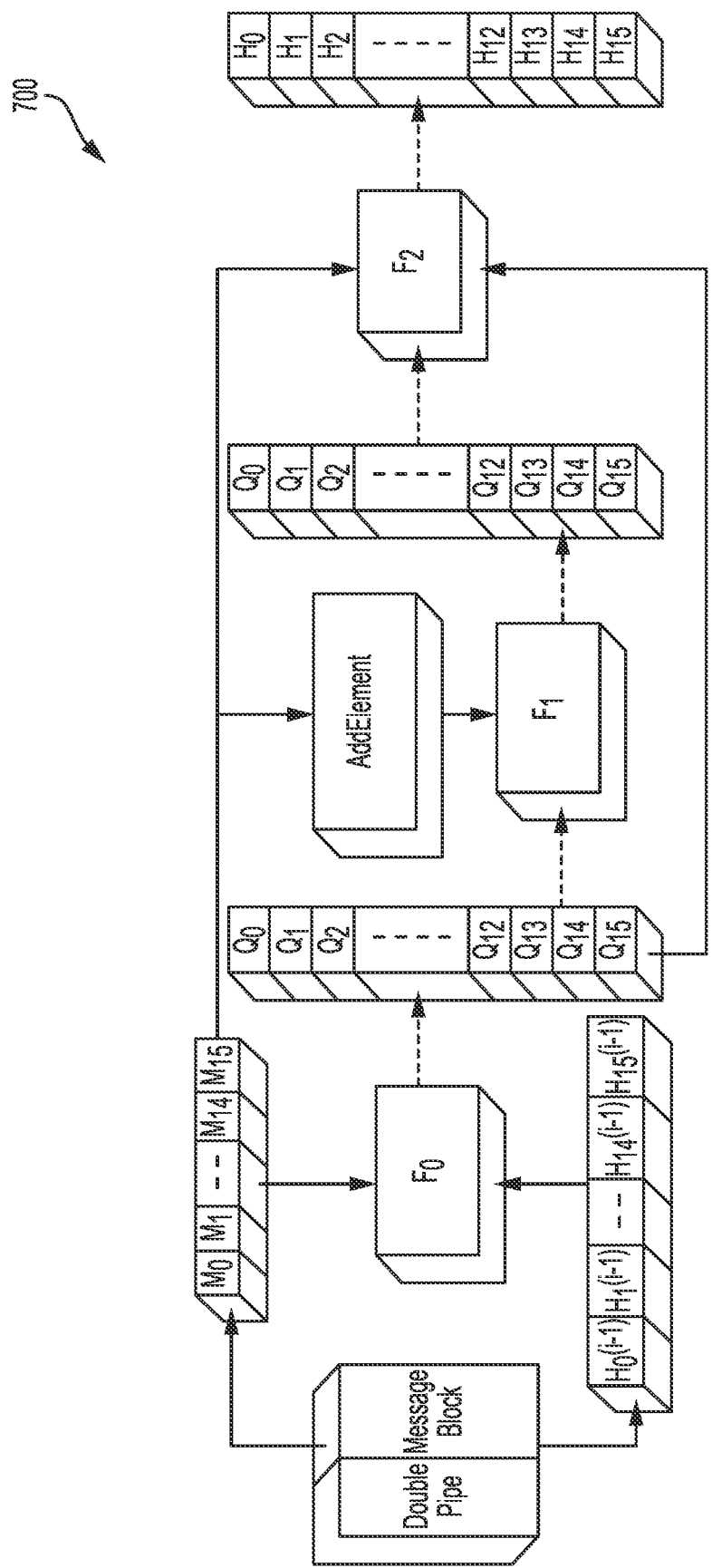
FIG. 7 illustrates a schematic representation of a functional process, according to an example embodiment.

FIG. 7 illustrates a schematic representation of a functional process 700, according to an example embodiment. The functional process 700 could be carried out by systems and methods described herein and could be similar or identical to the Blue Midnight Wish (BMW) hash function. BMW is a wide-pipe Merkle-Damgård hash construction with an unconventional compression function. The nonlinearity in BMW is derived from the overlap of modular XOR and addition operations. The BMW-n hash function family contains four instances for n=224, 256, 384, and 512, where n is the size of the hash value. BMW performs four different operations in the hash computation stage: bit-wise logical word XOR, word addition and subtraction, shift operations (left or right), and rotate left operations. The size of a word is 32 bits for BMW-224/256 and 64 bits for BMW-384/512.

The functional process 700 may include a plurality of functions, such a bijective function ($f_0$), an expansion function ($f_1$), and a final output function ($f_2$), which can be carried out to generate a chaining value. The i value is from 0 to 15. Inputs for the function $f_0$ include two arguments: input message block M and initial double pipe values $H^{(i-1)}$. Input message block M includes sixteen 64-bit words $M_0^{(i)}$, $M_1^{(i)}, \ldots, M_{15}^{(i)}$, $H_0^{(i-1)}, H_1^{(i-1)}, \ldots, H_{15}^{(i-1)}$ include sixteen 32-bit words that are the initial double pipe hash values. $Q_0^{(i)}, Q_1^{(i)}, \ldots, Q_{15}^{(i)}$ are the output of the Bijective function, $f_0$.

The second function, $f_1$, takes the output of $f_0$ and the output operation of processing the message M into the AddElement block to produce the second part of the quadruple pipe $Q_{16}^{(i)}, Q_{17}^{(i)}, \ldots, Q_{31}^{(i)}$. The final function $f_2$ produces the $H_0^{(i)}, H_1^{(i)}, \ldots, H_{15}^{(i)}$ by processing the output of the message, $f_0$, and $f_1$.

In some embodiments, systems and methods described herein may be implemented on an FPGA and $f_0$, $f_1$, and $f_2$ can be executed in 1000 cycles. The throughput of the design is given by the equation:

$$\text{Throughput} = \frac{\text{Number of input bits} \times \text{Max frequency}}{\text{Number of clock cycles per block}}$$

The throughput/area ratio (area efficiency) for the systems and methods described herein is much higher than conventional designs. In some embodiments, the systems and methods described herein need not utilize block memories to store intermediate coefficient values and instruction sets. Furthermore, the instruction sets described herein can be stored within a total of 1792 bytes. Yet further, some implementations of the present systems and methods consume less than 120.75 μW, or approximately 8.4 nW/bit.

The memory devices (e.g., instruction memory 110 and coefficient memory 140) may include a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

Various elements of system 100 (e.g., arithmetic logic unit 120, rotator 130, and accumulator 150 could be configured to execute instructions stored in the instruction memory 110 so as to carry out various operations and method steps/blocks described herein. The instructions may be stored in a permanent or transitory manner in the instruction memory 110.

While systems and methods described herein relate to specific configurations of elements, it will be understood that other types of reconfigurable coprocessors are contemplated and possible. As an example, the reconfigurable cryptographic coprocessor could be modelled, at least in part, after the human nervous system, which includes receptors, effectors, and a neural network. The receptors receive input either from internal stimuli or from the external world. In response to such inputs, the receptors may provide output in the form of electrical signals. The effectors translate the electrical signals from the receptors into responses, which may be expressed in an external environment. In some scenarios, a neural network may act as an intermediary. That is, the neural network can accept input signals from one or more receptors, make a decision based on the inputs, and generate output signals, which may be transmitted to one or more effectors. Several functions of the nervous system can be performed by neurons, which process information by receiving external stimuli, translate those stimuli into electrical signals, and then transmit information by way of releasing chemical neurotransmitters.

Artificial neural networks (ANNs) are computing systems inspired by neurons and neural networks found in animals. ANNs include a plurality of artificial neurons. Each artificial neuron may process a received (input) signal so as to generate an output signal according to an activation function. The activation functions accept one or more real number inputs and provide an output based on a non-linear function of a sum of the inputs. Some conventional ANNs use non-linear sigmoid functions, which are bounded, differentiable, real functions that have a characteristic "S-curve". Some sigmoid functions include, but need not be limited to, hyperbolic tangent and logistic functions.

ANNs also include a plurality of edges or nodes, which represent interconnections between two or more artificial neurons. At each edge or node, information can be transmitted from one artificial neuron to one or more other artificial neurons. Furthermore, each edge or node can have a corresponding weight that could be adjusted dynamically as a process (e.g., a machine learning algorithm) progresses.

Accordingly, the reconfigurable cryptographic coprocessor could include one or more ANNs. That is, the present disclosure relates to systems and methods that include a reconfigurable neural network processing element, which can be utilized as an artificial neuron in ANNs. Such a reconfigurable processing element can be implemented with both field-programmable gate arrays (FPGAs) and application-specific integrated circuits (ASICs). The systems and methods described herein may apply to various types of neural networks, such as feedforward neural networks, radial basis function (RBF) neural networks, and self-organizing feature maps (SOFMs or Kohonen maps), among others.

III. Example Methods

Figure 8:
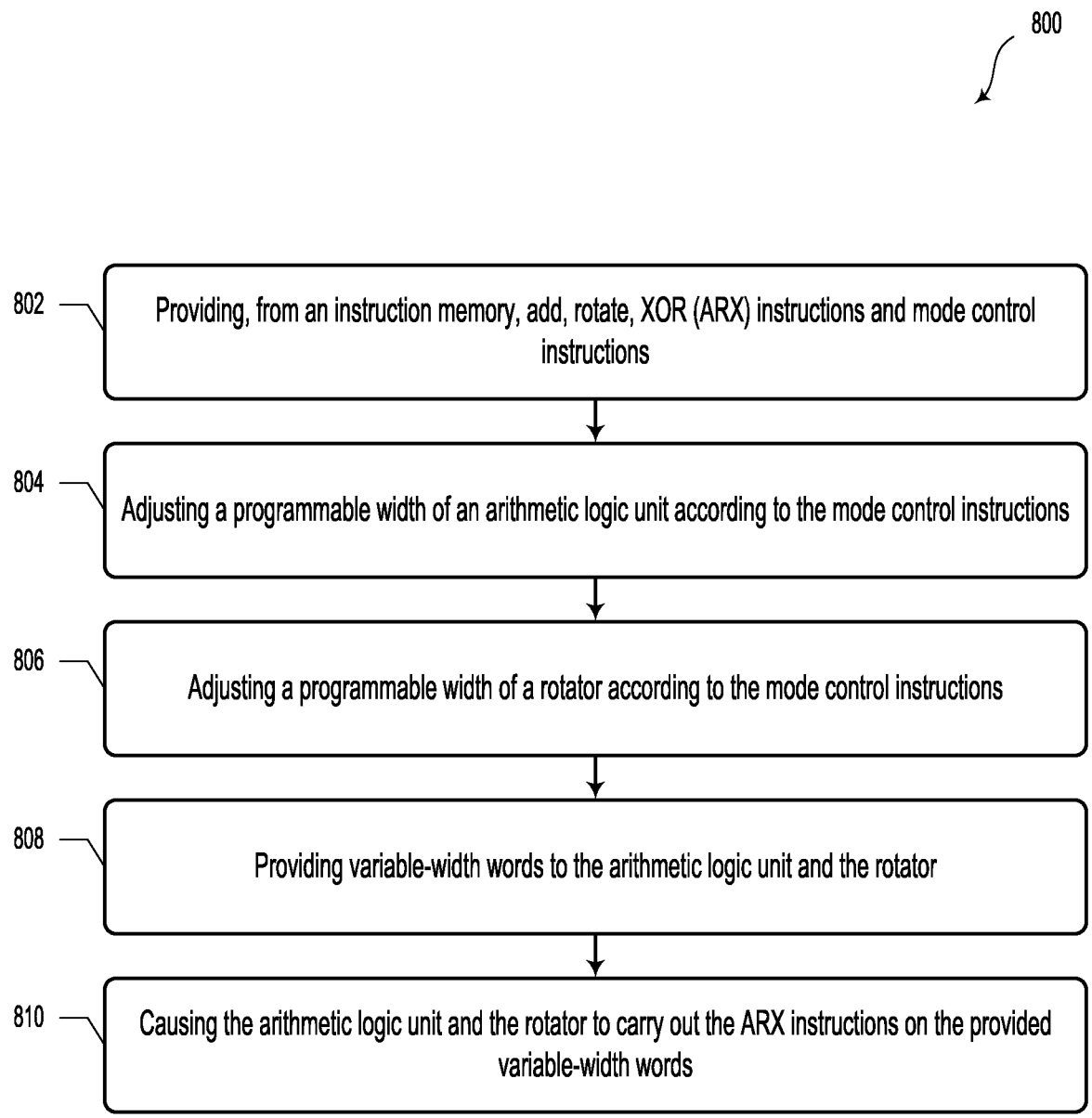
FIG. 8 illustrates a method, according to an example embodiment.

FIG. 8 illustrates a method 800, according to an example embodiment. It will be understood that the method 800 may include fewer or more steps or blocks than those expressly illustrated or otherwise disclosed herein. Furthermore, respective steps or blocks of method 800 may be performed in any order and each step or block may be performed one or more times. In some embodiments, some or all of the blocks or steps of method 800 may be carried out by elements of system 100. For example, some or all of method 800 could be carried out by the instruction memory 110, the arithmetic logic unit 120, the rotator 130, and/or the accumulator 150, among other elements as illustrated and described in relation to FIG. 1. It will be understood that other scenarios are possible and contemplated within the context of the present disclosure.

Block 802 includes providing, from an instruction memory, add, rotate, XOR (ARX) instructions and mode control instructions. As an example, providing the ARX instructions and mode control instructions could include the instruction memory 110 providing an instruction (e.g., instruction 500 as illustrated and described in reference to FIG. 5) to several elements of system 100 (e.g., the arithmetic logic unit 120, the coefficient memory 140, and the rotator 130).

Block 804 includes adjusting a programmable width of an arithmetic logic unit according to the mode control instructions. In some embodiments, adjusting the programmable width of the arithmetic logic unit could include the arithmetic logic unit 120 receiving control instructions via the instruction 500. The control instructions could include, for example, mode and operation control bits.

Block 806 includes adjusting a programmable width of a rotator according to the mode control instructions. Adjusting the programmable width of the rotator could include the rotator 130 receiving control instructions from the instruction memory 110 via instruction 500. The control instructions could include, for example, rotation control bits and mode control bits.

Block 808 includes providing variable-width words to the arithmetic logic unit and the rotator. In some embodiments, providing the variable-width words to the arithmetic logic unit and the rotator could include providing 16-bit, 32-bit, 48-bit, and/or 64-bit words to the arithmetic logic unit 120 via the first ALU input 122, the second ALU input 124, and/or the rotator input port 132.

Block 810 includes causing the arithmetic logic unit and the rotator to carry out the ARX instructions on the provided variable-width words. In some embodiments, causing the arithmetic logic unit and the rotator to carry out the ARX instructions could include conveying a plurality of ARX instructions to the arithmetic logic unit 120 and the rotator 130. As described herein, the ARX instructions could include operations that carry out addition, rotation, and XOR functions on the variable-width words.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A method comprising:
   providing, from an instruction memory, add, rotate, XOR (ARX) instructions and mode control instructions;
   adjusting a programmable width of an arithmetic logic unit (ALU) according to the mode control instructions;
   adjusting a programmable width of a rotator according to the mode control instructions;
   providing variable-width words to the arithmetic logic unit and the rotator; and
   causing the arithmetic logic unit and the rotator to carry out the ARX instructions on the provided variable-width words.

2. The method of claim 1, wherein providing the ARX instructions and mode control instructions comprises providing the ARX instructions and the mode control instructions to at least one of: the arithmetic logic unit, the rotator, or a coefficient memory.

3. The method of claim 1, wherein the mode control instructions comprise at least one of: mode control bits or operation control bits, wherein the mode control instructions are indicative of a desired programmable width of the arithmetic logic unit and a desired programmable width of the rotator.

4. The method of claim 1, further comprising carrying out a cryptographic hash function.

5. The method of claim 4, wherein the cryptographic hash function comprises at least one of: a Blue Midnight Wish (BMW) hash function, Secure Hash Algorithm 1 (SHA-1), Secure Hash Algorithm 2 (SHA-2), or Secure Hash Algorithm 3 (SHA-3).

6. The method of claim 5, wherein the BMW hash function is configured to perform a plurality of different hash computation operations comprising: a bit-wise logical word XOR, word addition and subtraction, shift operations (left or right), and rotate operations.

7. The method of claim 5, wherein the BMW hash function comprises at least one of four instances where n=224, 256, 384, and 512, where n is the size of the hash value.

8. The method of claim 7, wherein if n=224 or 256, the variable-width words have a width of 32 bits, wherein if n=384 or 512, the variable-width words have a width of 64 bits.

9. The method of claim 1, wherein providing the variable-width words to the arithmetic logic unit comprises:
   accepting the variable-width words at a first ALU input of the arithmetic logic unit from a first output port; and
   accepting the variable-width words at a second ALU input of the arithmetic logic unit from at least one of a second output port or an output of an accumulator, wherein the first and second output ports are each 64-bits.

10. The method of claim 1, wherein providing the variable-width words to the arithmetic logic unit and the rotator comprises providing very long instruction words (VLIWs) to the arithmetic logic unit and the rotator.

11. The method of claim 10, wherein providing the VLIWs to the arithmetic logic unit and the rotator implements an encryption algorithm.

12. The method of claim 11, wherein the encryption algorithm comprises a 16-bit permutation ($\pi$16-Cipher) encryption algorithm.

13. The method of claim 11, wherein the method comprises:
   a bijective function ($f_0$);
   an expansion function ($f_1$);
   and a final output function ($f_2$).

14. The method of claim 1, further comprising controlling a finite state machine so as to adjust respective operating configurations of the arithmetic logic unit and the rotator based on the mode control instructions.

15. The method of claim 14, further comprising controlling a plurality of sub-ALUs according to 7-bit ALU control instructions from the finite state machine.

16. The method of claim 15, wherein the sub-ALUs are configurable to operate as at least one of: four 16-bit sub-ALUs, two 32-bit sub-ALUs, or one 64-bit arithmetic logic unit.

17. The method of claim 1, wherein at least some of the method steps are carried out by one or more artificial neural networks (ANNs).

18. The method of claim 17, further comprising processing, by way of the one or more ANNs, the variable-width words to generate an output signal based on an activation function.

19. The method of claim 18, wherein the activation function comprises a non-linear sigmoid function.

20. The method of claim 19, wherein the non-linear sigmoid function comprises at least one of: a hyperbolic tangent function or a logistic function.

* * * * *